United States Patent
Lu et al.

(10) Patent No.: US 7,509,438 B1
(45) Date of Patent: Mar. 24, 2009

(54) BI-DIRECTIONAL LINE SWITCHED RING SUPPORT FOR PATH TRACE MONITORING ON A PROTECTION PATH

(75) Inventors: Chenchuan Lu, Rohnert Park, CA (US); Philippe Daniel, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 936 days.

(21) Appl. No.: 10/366,803

(22) Filed: Feb. 14, 2003

(51) Int. Cl.
*H04B 10/00* (2006.01)

(52) U.S. Cl. .............................. 709/251; 398/5; 398/59; 398/19; 398/58; 398/33; 359/125; 359/167; 370/535; 370/403

(58) Field of Classification Search .................. 709/251, 709/104, 235; 370/458, 249, 254; 398/5, 398/17, 7, 59, 19, 33, 58
See application file for complete search history.

(56) References Cited

U.S. PATENT DOCUMENTS

| | | | |
|---|---|---|---|
| 6,009,075 A | 12/1999 | Roberts et al. | 370/219 |
| 6,137,603 A * | 10/2000 | Henmi | 398/4 |
| 6,163,527 A | 12/2000 | Ester et al. | 370/228 |
| 6,188,667 B1 | 2/2001 | Roberts et al. | 370/219 |
| 6,426,958 B1 * | 7/2002 | Crossett et al. | 370/466 |
| 6,731,648 B1 * | 5/2004 | Cotter | 370/458 |
| 6,904,061 B2 * | 6/2005 | Schmitt et al. | 370/535 |
| 6,992,978 B1 * | 1/2006 | Humblet et al. | 370/228 |
| 7,026,698 B2 * | 4/2006 | Okumura | 257/415 |
| 7,274,869 B1 * | 9/2007 | Pan | 398/5 |
| 2002/0109879 A1 * | 8/2002 | Wing So | 359/118 |

\* cited by examiner

*Primary Examiner*—Jude J Jean Gilles
(74) *Attorney, Agent, or Firm*—Aka Chan LLP

(57) ABSTRACT

Methods and apparatus for enabling a protection path within a network to be monitored are disclosed. According to one aspect of the present invention, a method for sending traffic on a path within an optical network system that has a plurality of nodes and a plurality of fibers includes identifying a circuit path within the optical network system which is associated with a first node and includes at least one fiber. The method also includes sending a signal that includes embedded path trace information on the circuit path from the first node on the fiber, and determining when the signal is received from the first node by a second node over the fiber. Finally, the method includes broadcasting path trace information to the plurality of nodes when it is determined that the signal is not received by the second node over the fiber.

21 Claims, 9 Drawing Sheets

BI-DIRECTIONAL LINE SWITCHED RING SUPPORT FOR PATH TRACE MONITORING ON A PROTECTION PATH

BACKGROUND OF THE INVENTION

1. Field of Invention

The present invention relates generally to optical network systems. More particularly, the present invention relates to enabling a path trace such as a J1 trace to be monitored even when a signal such as a synchronous transport signal is transmitted on a protection path.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

To address the demand for data communication services, the use of optical networks, such as a synchronous optical network (SONET), is becoming more prevalent. As will be appreciated by those skilled in the art, a SONET network is an example of a time division multiplexed (TDM) network. TDM networks generally allocate single lines to be used amongst multiple data streams or connections. The single lines may each be divided into slots of time during which each user has access to the single lines.

A network such as a TDM network is generally designed to ensure that information may be transferred between nodes within the network. Often, within a network, information is transferred between two specified nodes, i.e., a source node that sends information and a destination node which receives information. When information is to be sent between a source node and a destination node, a circuit path between the two nodes must be computed so that leased line services may be provided.

In general, a network may include at least one bi-directional line switched ring (BLSR). A BLSR typically allows data traffic to be sent in opposite directions. That is, for a bi-directional ring, traffic is often routed such that both directions of a two-way connection travel along the ring using the same ring nodes, but in opposite directions. A BLSR may typically include either two fibers or four fibers. As will be appreciated by those skilled in the art, a two fiber BLSR is a ring in which traffic is normally routed in both directions, i.e., in a clockwise direction and a counter-clockwise direction. On the other hand, network elements within a four fiber BLSR may be arranged to include two working fibers which may enable traffic to be routed in opposite directions and two protection fibers between two network elements.

FIG. 1a is a diagrammatic representation of a four fiber BLSR which includes four network elements. As shown, a BLSR 100 includes network elements 104 which are connected by working fibers 108 and protection fibers 112. Network elements 104 may generally be line terminating equipment or path terminating equipment, depending upon where circuit paths within BLSR 100 start and end. By way of example, for a circuit 124 which has a start point 116 at network element 104a and an end point 120 at network element 104c, network elements 104a, 104c may include path terminating equipment, while an intermediate network element 104b within circuit path 124 may include line terminating equipment.

Circuit path 124 may be defined on working fibers 108 between network element 104a and network element 104b, as well as between network element 104b and network element 104c. For example, a signal such as a synchronous transport signal (STS) may be sent in a clockwise direction, or an east-to-west direction, between network element 104a and network element 104c using working fiber 108a and working fiber 108b. An STS, as will be appreciated by those skilled in the art, may include a "name tag" which allows the STS to be differentiated from other STSs. The name tag may be a J1 byte or string, i.e., J1 bytes which are concatenated to form a string, that includes substantially any suitable identifying information, e.g., an address or an interface name, which may enable an STS to be identified. Specifically, a path trace identifier may be transmitted as part of a J1 byte in a path overhead, and may carry information such as a remote hostname, an interface name, and an internet protocol (IP) address. Typically, J1 information included in a J1 string may include up to sixty-four bytes.

After a circuit such as circuit path 124 is provisioned, network element 104a, which includes path terminating equipment, may transmit a path trace identifier as part of a J1 string along circuit path 124. That is, network element 104a may transmit J1 path trace information to other network elements included in circuit path 124 as part of an STS. Transmitting a J1 string as a part of an STS enables network elements 104 to determine the integrity of the STS when J1 monitoring is enabled, and, hence, to raise an alarm such as a TIM-P alarm when the J1 received by network elements 104 on circuit path 124 is not as expected.

In order to enable the J1 string embedded in the STS to be used to check the integrity of the STS, when circuit path 124 is provisioned, J1 information may be transmitted to substantially all network elements 104 included in circuit path 124. The transmitted J1 information may be broadcasted such that the information is received by a control card included in each network element 104 included in circuit path 124. The control card may then store the J1 information in a table of J1 information associated with substantially all circuits which use the network element 104 which houses the control card. The control card in each network element 104 included in circuit path 124 may then provide the J1 information to working linecards in its respective network element 104, as will be discussed below with respect to FIG. 2.

If J1 monitoring is enabled, when an STS which includes J1 information is sent from network element 104a to network element 104b on one of working fibers 108a, 108e, a monitor (not shown) which is associated with network element 104b determines whether the J1 information included in the STS matches the J1 information which was sent when circuit path 124 was provisioned. Irregardless of whether the J1 information matches, it should be appreciated that traffic may be forwarded to network element 104c on one of working fibers 108b, 108f. When the J1 information does not match, then an alarm may be raised which prompts a network administrator to take action with regards to an unexpected STS.

At times, working fibers 108 or network elements 104 may fail such that circuit path 124 between start point 116 and end point 120 may have to be altered. By way of example, when working fiber 108b fails, then if a suitable one of protection fibers 112b, 112f is available, a protection circuit path 124' between start point 116 and end point 120 may be use to send STS, as shown in FIG. 1b. Specifically, protection circuit path 124' may effectively include one of working fibers 108a, 108e, and one of protection fibers 112b, 112f. As will be appreciated by those skilled in the art, this is called a span switch, as traffic is switched to the protection span.

As will be discussed below with respect to FIG. 2, protection fibers 112 are coupled to protection linecards within network elements 104. Typically, protection linecards within network elements 104, as well as working linecards within network elements 104 which are not included in circuit path 124 of FIG. 1a, have no access to J1 information which is stored on control cards within network elements 104 included in circuit path 124. Without access to J1 information, J1 monitoring of the STS signal which passes through protection fibers 112 may not occur. As a result, the integrity of the STS may not be verified. In some cases, if the STS is sent to an incorrect network element 104 and when J1 monitoring does not occur, a customer may not detect that he is not receiving correct data. Neglecting to provide a customer with data he or she has requested, or inadvertently providing data to unscrupulous customers, may cause significant problems.

A network element within a BLSR may generally include working linecards, or input/output (I/O) cards, which are coupled to working fibers, and protection linecards which are coupled to protection fibers. FIG. 2 is a diagrammatic representation of a network element which is a part of a BLSR. A network element or node 204 includes working linecards 208a, 208b and protection linecards 208c, 208d. Linecards 208 are coupled to a control card 212 which may maintain information used by network element 204. By way of example, control card 212 may store a list of all J1 information which is expected to be received on, sent by, or pass through at least one working fiber 216 associated with network element 204.

Typically, when a circuit which includes network element 204 is provisioned, J1 information is broadcast such that control card 212 receives the J1 information. Control card 212 may then provide the J1 information to working linecards 208a, 208b. Hence, when an STS is sent across fiber 216a, for example, the J1 information embedded in the STS may be verified against J1 information stored on control card 212 when J1 monitoring is enabled. Control card 212 generally does not provider the J1 information to protection linecards 208c, 208d. As a result, if an STS is sent across one of protection fibers 220a, J1 monitoring is not possible.

In order to perform J1 monitoring, monitoring circuitry is generally included in each working linecard associated with a network element. FIG. 3 is a diagrammatic representation of a network element which is a part of a BLSR and includes components used to enable J1 monitoring. A network element 304 includes working linecards 308 and a control card 312. For ease of illustration, protection linecards within network element 304 have not been shown.

Substantially any linecard 308, e.g., linecard 308b, which is associated with a circuit in which J1 monitoring, which is typically set on a circuit basis, is allowed may include monitoring circuitry 324 which cooperates with software 328 to compare J1 information embedded within an STS which passes through a fiber 316 associated with linecard 308. Monitoring circuitry 324, which may include a processor (not shown) such as a central processing unit may facilitate the collection of J1 information and may cooperate with software 328 to compare J1 information which is expected by network element 304 against the J1 information obtained from an STS. The results of a comparison may be passed from software 328 to control card 312, e.g., for storage. The J1 information which is expected by network element 304, as previously mentioned, is maintained by control card 312 after the J1 information is effectively broadcast at the time circuits which include network element 304 are provisioned.

Monitoring display 332 is coupled to control card 312, may retrieve information from control card 312 and display the information. Information retrieved from control card 312 may include J1 information which is expected by network element 304 and actual J1 information which is embedded in an STS. The use of monitoring display 332 enables a network administrator or other user to substantially verify the integrity of an STS signal which uses working fibers 316 when J1 monitoring is enabled.

With reference to FIG. 4, the steps associated with one method of sending an STS on a BLSR when J1 monitoring is enabled or selected, either manually or automatically, will be described. A process 400 begins at step 404 in which circuit provisioning in a BLSR is initiated. Initiating circuit provisioning generally includes identifying network elements which are to be included in a circuit. Once circuit provisioning is initiated, J1 information is sent to network elements included in the circuit in step 408. As will be understood by those skilled in the art, the J1 information may often be provided only to the linecards associated with working fibers of the circuit.

In step 412, an STS, which includes embedded J1 information, is sent from a "current" network element to an appropriate network element. By way of example, when the STS is initially being sent from a beginning or starting network element to a first intermediate network element in the circuit, the beginning network element may be the current network element while the first intermediate network element may be the appropriate network element. After the STS is sent, it is determined in step 416 whether the STS is received by the appropriate network element on a working fiber. In other words, it is effectively determined whether the STS has been switched to a protection fiber.

When it is determined in step 416 that the STS was received by the appropriate network element on a working fiber, then the indication is that the J1 trace may be monitored. Accordingly, in step 420, the J1 trace is monitored to verify the continuity of an overall circuit or working path which includes the working fiber. Verifying the continuity of the J1 trace typically includes comparing J1 information stored within the appropriate network element to the J1 information embedded in the STS. Once the continuity of the J1 trace is verified, it is determined in step 424 whether the STS has reached its end point, i.e., whether the STS has reached the network element at its destination within the BLSR ring. If it is determined that the STS has reached its end point, then the process of sending an STS on a BLSR is completed. Alternatively, if it is determined that the STS has not reached its end point, the process flow returns to step 412 in which the STS is sent to the next appropriate network element in the circuit.

Returning to step 416, when it is determined that the STS has not been received by the appropriate network element on a working fiber, then the implication is typically that the STS has been switched to a protection fiber. As such, the J1 trace associated with the STS may not be monitored, as protection linecards generally are not privy to J1 information. When the J1 trace may not be monitored, the integrity of the STS may not be determined. From step 416, if the indication is that the STS has been switched to a protection fiber, process flow proceeds to step 424 in which it is determined if the STS has reached its end point.

The ability to perform J1 monitoring such that a J1 trace may be monitored is crucial in many cases to assure the integrity of an STS. However, when an STS is sent over a protection circuit path, the ability to perform J1 monitoring over the entire circuit path is lost. As a result, the integrity of the STS may not be verified, and misconnections within a protection circuit path may occur such that the wrong data is sent to a customer, or data may be sent to the wrong customer.

Therefore, what is needed is a system which enables J1 monitoring to occur with respect to an STS that is transmitted across a protection path. That is, what is desired is a method and an apparatus which allows for path traces to be monitored regardless of whether the path traces are part of a signal that is transmitted across a working circuit path or a protection circuit path.

SUMMARY OF THE INVENTION

The present invention relates to a system for enabling a protection path within a network to be monitored. According to one aspect of the present invention, a method for sending traffic on a path within an optical network system that has a plurality of nodes and a plurality of fibers includes identifying a circuit path within the optical network system which is associated with a first node and includes at least one fiber. The method also includes sending a signal that includes embedded path trace information on the circuit path from the first node on the fiber, and determining when the signal is received from the first node by a second node over the fiber. Finally, the method includes broadcasting path trace information to the plurality of nodes when it is determined that the signal is not received by the second node over the fiber.

When a signal, as for example a synchronous transport signal (STS) is being sent within an optical network, the signal is typically sent on a working path from a source to a destination, or end point. A signal sent on the working path may be monitored, as for example using J1 trace monitoring, to verify the continuity and the integrity of the signal. When there is a failure of the working path, the signal may be rerouted on a protection path from a node in the working path to the end point. Enabling J1 information used for trace monitoring to be broadcast to substantially all nodes in a network, as for example once a failure is detected on the working path, enables nodes of a protection path to perform J1 monitoring. Allowing monitoring to occur on a protection path enables alarms to be raised when an inconsistency between an expected signal and an actual signal is detected on a protection path. Hence, the overall performance associated with network may be improved.

According to another aspect of the present invention, a method for sending traffic on a path within an optical network system includes identifying a circuit path that includes at least one fiber selected from a plurality of fibers, a start node selected from a plurality of nodes, and an end node selected from the plurality of nodes. The method also includes transmitting path trace information to the plurality of nodes which includes at least one node that is not included in the circuit path.

In one embodiment, the method also includes sending a signal on the circuit path, determining when the fiber is unable to support the signal, and identifying a protection path within the optical system when it is determined that at least one fiber is unable to support the signal. The protection path is arranged to enable the signal to be provided to the end node. In such an embodiment, the method may also include sending the signal on the protection path when it is determined that at least one fiber is unable to support the signal, and monitoring the signal by comparing path trace information included in the signal with the transmitted path trace information to determine when the path trace information included in the signal is consistent with the transmitted path trace information.

According to still another aspect of the present invention, an optical network system includes network elements and fibers which interconnect at least some of the network elements. The network system also includes a circuit path that is defined to include a first set of the fibers, and is also defined to include at least a first network element and a second network element. Path trace monitoring is arranged to be enabled on the circuit path. A protection path of the network system is defined to include a second set of fibers, the first network element, and the second network element. Path trace monitoring is arranged to be enabled on the protection path. In one embodiment, the network elements and the fibers are included in a bi-directional line switched ring.

According to yet another aspect of the present invention, a method for sending traffic on a path within an optical network system includes identifying a circuit path that has a fiber selected from a plurality of fibers and a set of nodes, and sending a signal which includes embedded path trace information on the circuit path between a first node and a second node of the set of nodes on the fiber. The method also includes determining when the signal is received by the second node, and broadcasting path trace information to substantially all nodes, including nodes not in the set of nodes, when it is determined that the signal is not received by the second node over the fiber.

In one embodiment, the method also includes transmitting the path trace information to the set of nodes before sending the signal on the circuit path, and monitoring the signal using the second node to determine if the transmitted path trace information and the embedded path trace information are consistent when it is determined that the signal is received by the second node over the fiber. In another embodiment, the method includes identifying a protection path that includes a different fiber and a third node when it is determined that determined that the signal is not received by the second node over the fiber, sending the signal on the protection path, and monitoring the embedded path trace information included in the signal through the use of the broadcasted path trace information.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a diagrammatic representation of a protection path on a four fiber BLSR, e.g., BLSR 100 of FIG. 1a.

DETAILED DESCRIPTION OF THE EMBODIMENTS

Performing path trace monitoring such as J1 monitoring generally enables the integrity of a signal such as a synchronous transport signal (STS) to be substantially assured. Monitoring is crucial in many cases, for example, in order to identify corrupted signals that have been sent, as well as to identify information that has been sent to unauthorized users. In conventional systems such as synchronous optical network (SONET) systems which include a bi-directional line switched ring (BLSR), since path trace monitoring is not available on protection paths, when a working fiber failure necessitates the use of a protection path, the ability to perform path trace monitoring is lost. As a result, the integrity of a signal sent on a protection path may not be verified, thereby potentially causing the erroneous information to be sent to a customer, or information to be sent to the wrong customer.

When a failure of a working line that is part of a circuit path is detected by switching network elements, if the switching network elements broadcast or otherwise disperse path trace information to other network elements within the BLSR, then path trace monitoring may occur on a protection path. Specifically, when a line failure such as a cut fiber is detected by two substantially adjacent nodes or network elements at the opposite ends of the line failure, i.e., switching network elements, the two switching network elements may switch the signal or traffic on the failed line to a protection path. As the protection path generally is routed through network elements other than the switching network element which is on the intended receiving end of the line failure, when path trace information is available on substantially all network elements within the BLSR, path trace monitoring may occur on the protection path. Hence, the integrity of the signal or traffic sent through the protection path may be determined.

Figure 1A:
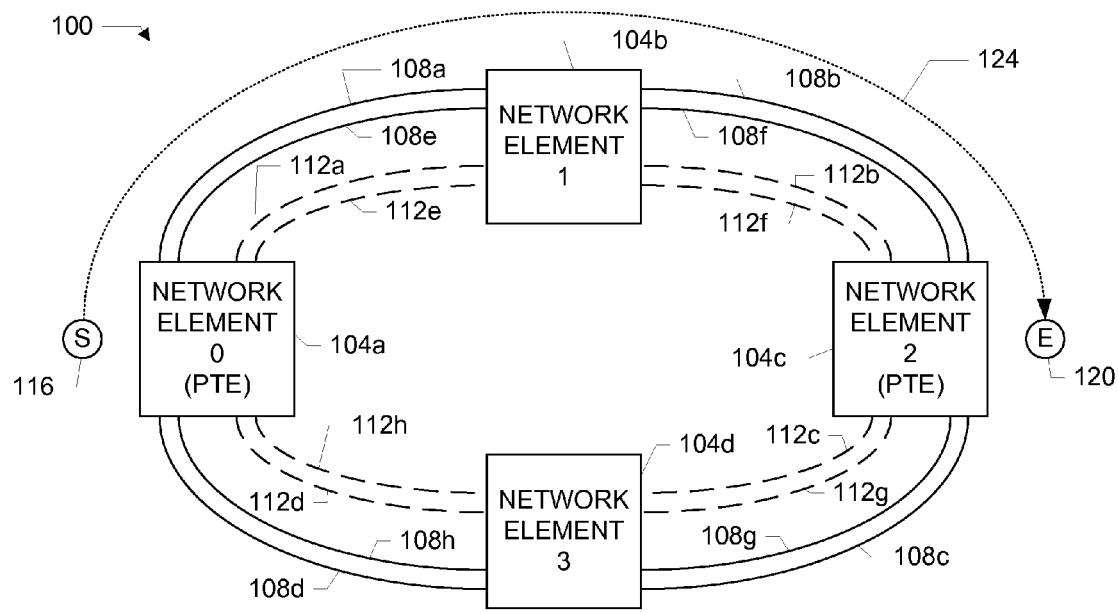
FIG. 1a is a diagrammatic representation of a working path on a four fiber BLSR.
Figure 1B:
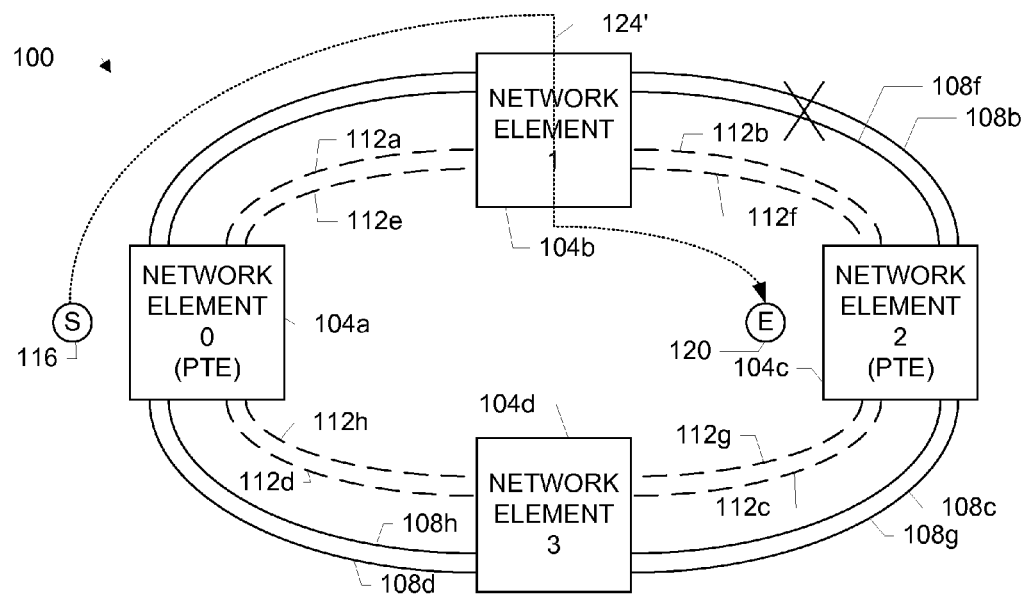
Figure 2:
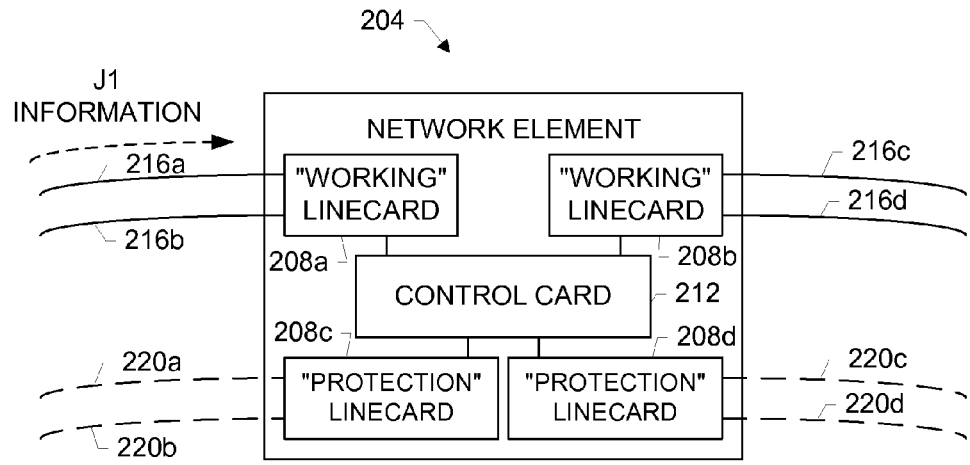
FIG. 2 is a diagrammatic representation of a network element which is a part of a BLSR.
Figure 3:
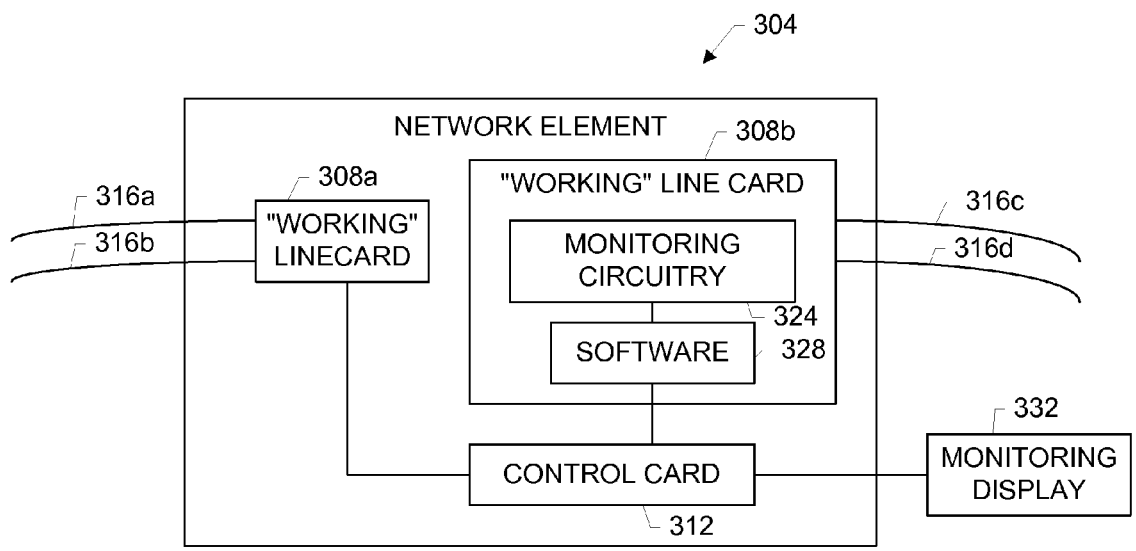
FIG. 3 is a diagrammatic representation of a network element which is a part of a BLSR and includes components used to enable J1 monitoring.
Figure 4:
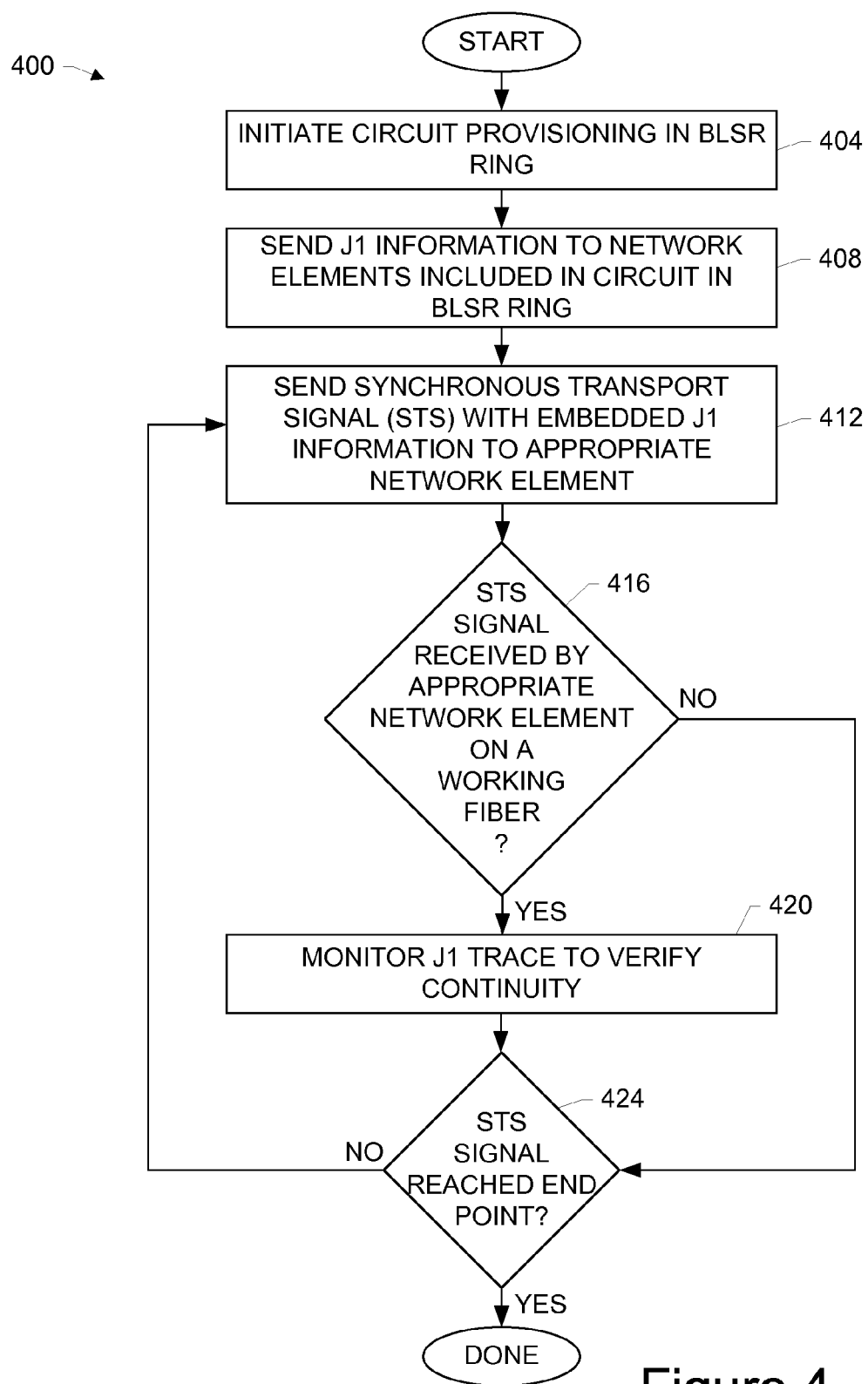
FIG. 4 is a process flow diagram which illustrates the steps associated with one method of sending an STS on a BLSR when J1 monitoring is enabled.
Figure 5:
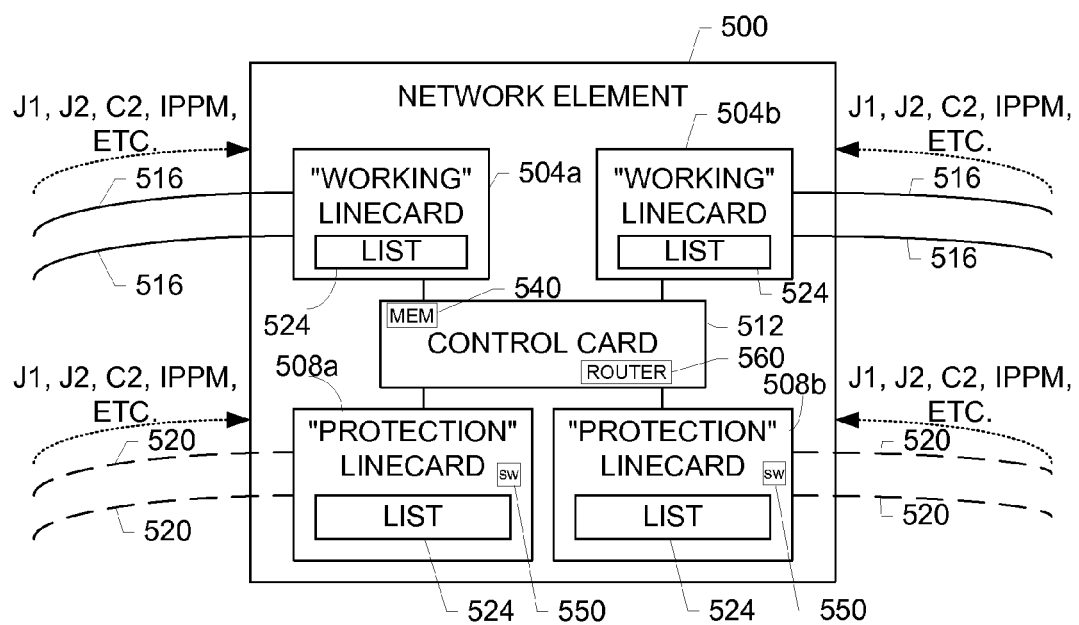
FIG. 5 is a diagrammatic representation of a network element which has working linecards and protection linecards that have access to path trace information in accordance with an embodiment of the present invention.

With reference to FIG. 5, a network element which has working linecards and protection linecards which have access to path trace information will be described in accordance with an embodiment of the present invention. A network element 500 includes working linecards 504, which are coupled to working fibers 516 of a ring, e.g., a BLSR ring, and protection linecards 508, which are coupled to protection fibers 520 of the ring. It should be appreciated that the number of working fibers 516 and protection fibers 520 within a ring may generally be widely varied. For example, a BLSR may be a two-fiber BLSR or a four-fiber BLSR.

Linecards 504, 508 are coupled to a control card 512 which is arranged to store information which may include, but is not limited to, a list of path trace information such as J1 trace information. Control card 512 may include components such as a memory 540 and a router 560 which enables UDP and TCP packets, for instance, to be sent by network element 500.

When path trace information is sent or broadcast to network element 500, control card 512 may receive the information, store it, and provide it to linecards 504, 508 as a part of a list 524 of path trace information.

Since protection linecards 508 have access to path trace information, e.g., J1 path trace information, when network element 500 is a component of a protection circuit path, path trace monitoring may occur. Once control card 512 provides protection linecards 508, or linecards which carry a protected signal or protected traffic, with trace information, software 550 associated with protection linecards 508 may then configure hardware (not shown) on linecards 508 to monitor the appropriate trace of a received signal or traffic on a protection fiber 520. Software 550 may compare the trace information with embedded trace information received on a protection fiber 520 as a part of a signal to monitor the signal to verify the continuity of the signal. That is, at least one of protection linecards 508 may effectively configure hardware and execute software 550 which allows a determination to be made regarding whether the signal received on network element 500 was expected and, if not, allows an alarm such as a TIM-P alarm to be raised to indicate that a mismatch has been detected. In one embodiment, linecards 508 may continue to monitor a suitable trace associated with a signal received on protection fibers 520 until either monitoring capabilities are suspended, as for example by a user, or a notification is received that the signal is no longer being sent on a protection fibers 520, e.g., that traffic has been switched back to a working path.

The contents of list 524 may vary widely. By way of example, when intermediate path performance monitoring (IPPM) is desired, IPPM information may be stored in list 524. In addition, when C2 monitoring is desired, C2 information may be included in list 524. Likewise, when J2 monitoring is desired, J2 information may be included in list 524. In general, the type of information stored in list 524 depends upon the type of path trace monitoring which is desired, as well as the type of signal which is being sent within a ring. It should be understood that more than one type of information may be stored in list 524. That is, different types of monitoring information may co-exist within list 524.

In order to enable trace monitoring on a protection path, trace information may be broadcast from switching nodes or network elements through a network ring. A switching node may generally receive a signal and switch traffic received on the node from a working path to a protection path, or vice versa. The trace information, which is provided to network elements associated with a circuit path when the circuit path is provisioned, may be broadcast by switching nodes which are on either end of a path failure. That is, trace information may be broadcast by the network element which was attempting to send a signal over a failed fiber and the network element which was expected to receive the signal over the failed fiber.

Figure 6A:
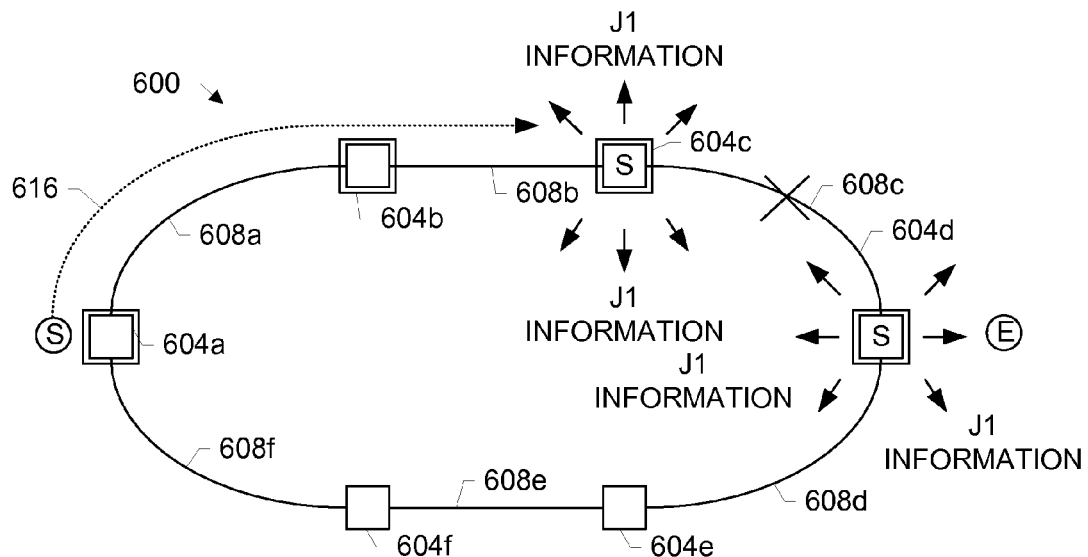
FIG. 6a is a diagrammatic representation of a BLSR with two switching nodes which are arranged to broadcast trace information in accordance with an embodiment of the present invention.

FIG. 6a is a diagrammatic representation of a BLSR with two switching nodes which are arranged to broadcast trace information in accordance with an embodiment of the present invention. For ease of discussion, although the signal to be sent across a circuit path may be substantially any signal, and the trace information may be substantially any suitable trace information, in the described embodiment, a signal is an STS and trace information is J1 information. A BLSR 600 includes network elements or nodes 604. A circuit path which starts at node 604a, passes through nodes 604b, 604c, and ends at node 604d, may include a failure on a fiber or link 608c between nodes 604c, 604d. As a result, switching nodes 604c, 604d may detect that an STS 616 has not been successfully sent between node 604c and node 604d. It should be appreciated that since the circuit path for STS 616 includes nodes 604*a-d*, each of nodes 604*a-d* has J1 information stored thereon, as for example in associated control cards. Nodes 604 are generally in communication using fibers 608. It should be appreciated that, for clarity, not all fibers which are included in ring 600 have been shown.

When fiber 608*c*, which is generally a working fiber, fails, nodes 604*c*, 604*d* may determine that STS 616 was not successfully sent from node 604*c* to node 604*d* on fiber 608*c*. Upon making such a determination, working linecards associated with nodes 604*c*, 604*d* may effectively send reports to control cards associated with nodes 604*c*, 604*d* which indicate that fiber 608*c* has failed, e.g., been cut. Control cards may then cause J1 information, which is typically stored in a table or similar data structure on control cards, to be broadcast to substantially all nodes 604 within ring 600. In other words, nodes 604*c*, 604*d* which are on either end of failed fiber 608*c* send J1 information pertaining to STS 616 to substantially all nodes 604. The J1 information may be sent across fibers 608, which may include both working fibers and protection fibers, although the J1 information may generally be sent using substantially any suitable method. By way of example, if network elements are connected by a local area network, then information may be sent through the local area network.

Broadcasting J1 information throughout ring 600 enables control cards associated with nodes 604 to receive the J1 information and to store the J1 information. The control cards in each node 604 may also provide the J1 information to both working linecards and protection linecards of nodes 604, e.g., a control card in node 604*f* may provide the J1 information to linecards within node 604*f*.

Figure 6B:
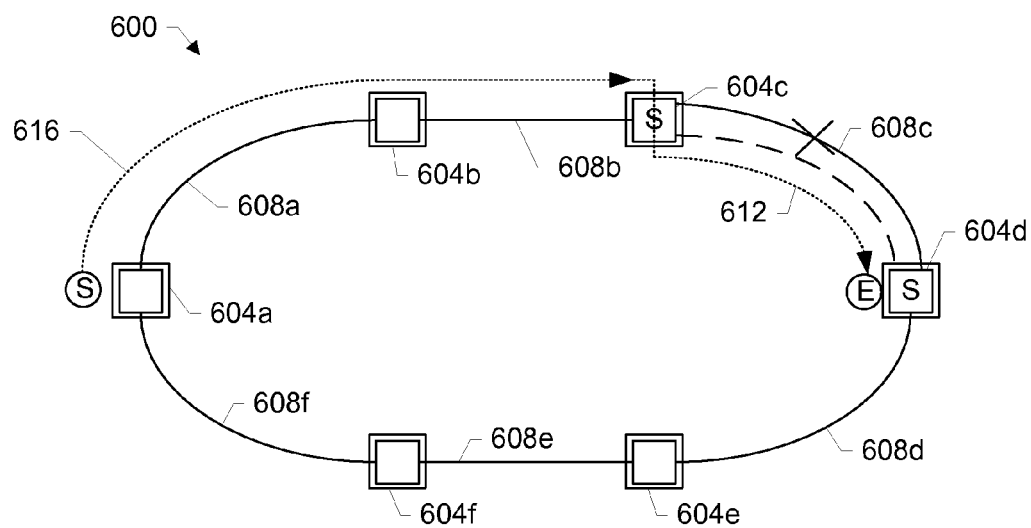
FIG. 6b is a diagrammatic representation of a BLSR, e.g., BLSR 600 of FIG. 6a, with a first protection path after trace information has been broadcast in accordance with an embodiment of the present invention.

After J1 information is broadcast, the J1 information is available to substantially every node 604 within ring 600, which may be a four fiber BLSR span switch. As shown in FIG. 6*b*, STS 616 may then be sent on a protection fiber 612 from node 604*c* to node 604*d*. Since protection linecards within nodes 604*c*, 604*d* have access to J1 information, the continuity of STS 616 may be monitored and verified when STS 616 is sent over protection fiber 612.

Figure 6C:
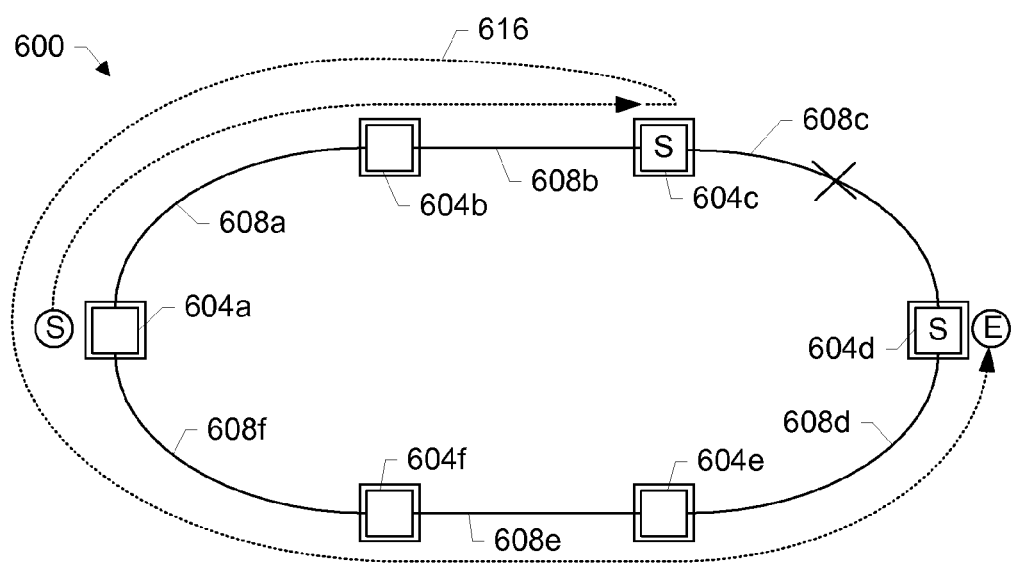
FIG. 6c is a diagrammatic representation of a BLSR, e.g., BLSR 600 of FIG. 6a, with a second protection path after trace information has been broadcast in accordance with an embodiment of the present invention.

In the case of a two fiber and a four fiber BLSR ring switch, as shown in FIG. 6*c*, STS 616 may be sent on fibers 608 through an alternate path to node 604*d* when there is no fiber available substantially directly between node 604*c* and node 604*d*. It should be appreciated that when signal 616 is sent back on fibers 608 through nodes 604*b*, 694*a*, signal 616 is typically sent on different lines than were used to initially send signal 616 from node 604*a* to node 604*c*. The individual lines have not been shown for ease of illustration. Since nodes 604*f*, 604*e* received broadcasted J1 information, J1 monitoring may occur using nodes 604*f*, 604*e*. As such, the continuity of signal 616 may be verified over a protection path as signal 616 is routed through nodes 604*f*, 604*e*.

Figure 7A:
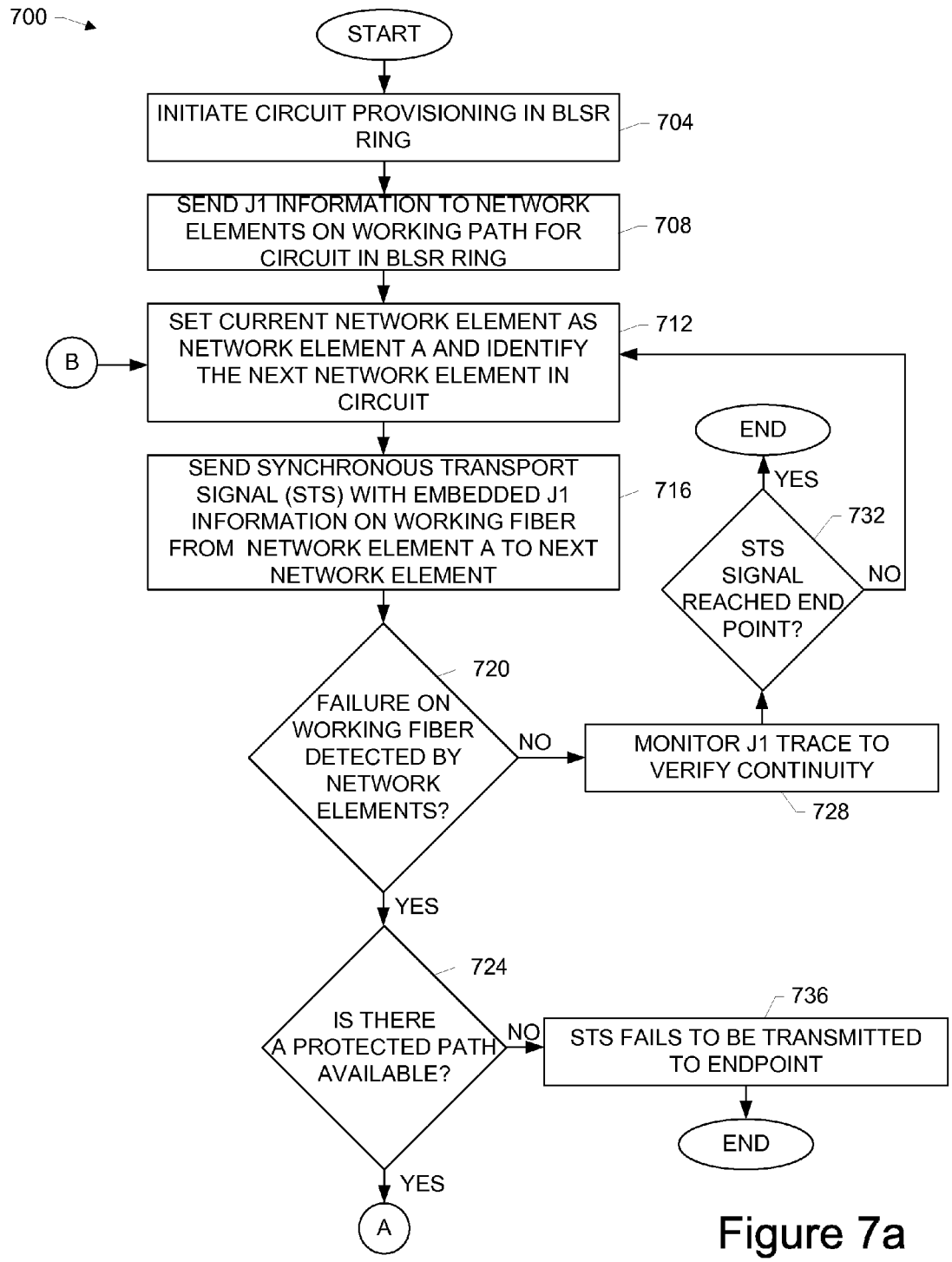
FIGS. 7a and 7b are a process flow diagram which illustrates a method of sending a signal through a BLSR in which J1 monitoring on protection paths is enabled in accordance with an embodiment of the present invention.
Figure 7B:
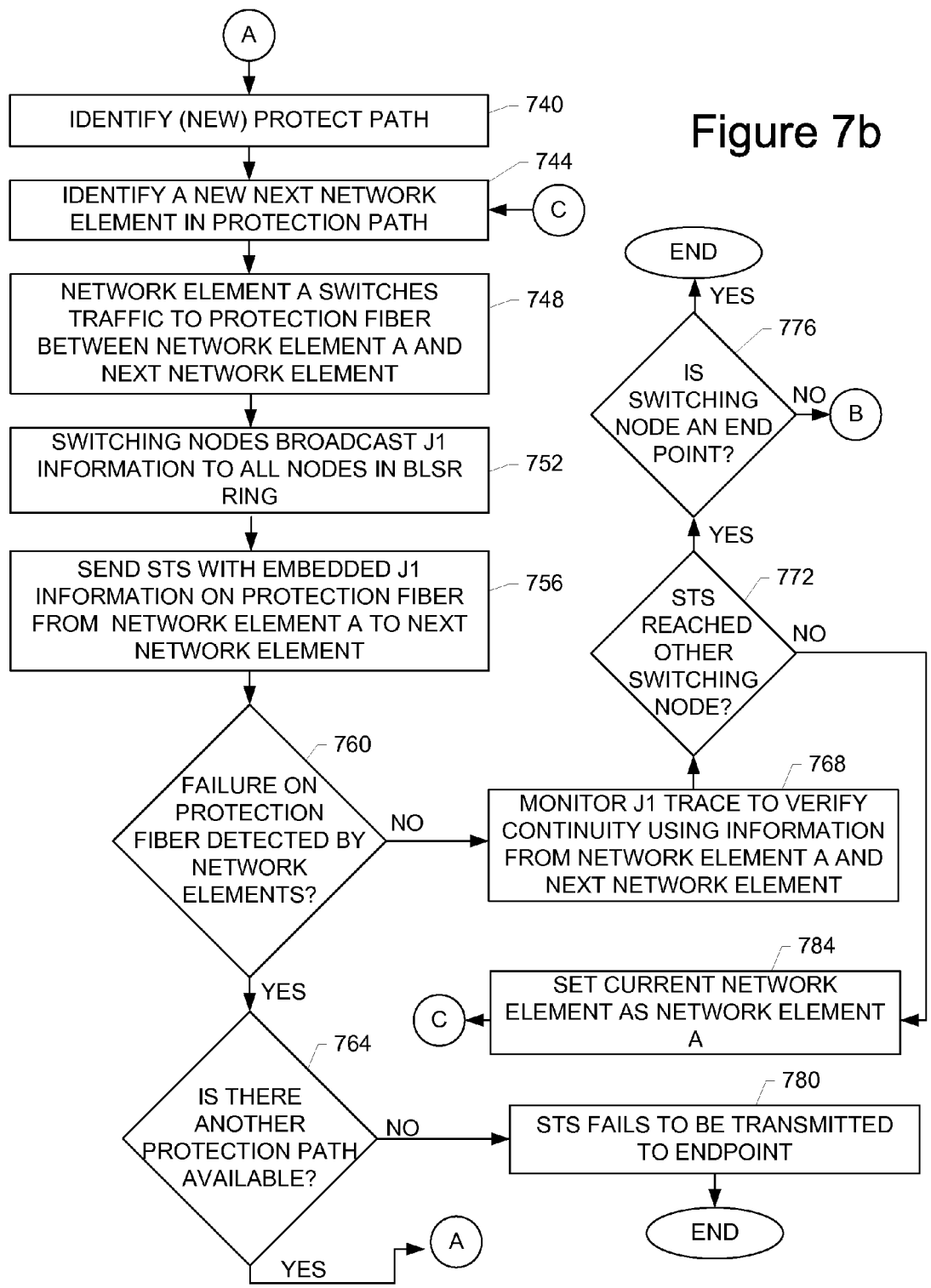

Referring next to FIGS. 7*a* and 7*b*, a method of sending a signal through a BLSR in which J1 monitoring on protection paths is enabled will be described in accordance with an embodiment of the present invention. A process 700 of sending a signal begins at step 704 in which circuit provisioning in a BLSR is initiated. During circuit provisioning, in the described embodiment, J1 information is sent to network elements which are included on a working path for the circuit in step 708. It should be appreciated that in lieu of or in addition to sending J1 information, which pertains to an STS, other types of information which may be monitored such as C2 information or IPPM information, may be sent if other types of signals are to be passed within a BLSR.

After the J1 information is sent to network elements on a working path, the current network element, e.g., the network element which currently has "possession" of a signal, is set as network element 'A', and the next network element which is expected to receive the signal from network element 'A' is identified in step 712. When a signal is to be initiated, then the current network element is typically the start point or node of a path or circuit, while the next network element may be the first intermediate node within the path.

Once network element 'A' is set and the next network element is identified, then a signal, as for example an STS with embedded J1 information, is sent in step 716 on a working fiber from network element 'A' to the next network element. It is then determined in step 720 whether a failure on the working fiber is detected by the network elements, i.e., network element 'A' and the next network element. In other words, a determination is made regarding whether the signal was successfully sent and received using a working fiber.

If it is determined in step 720 that no failure on the working fiber is detected by either network element 'A' or the next network element, the process flow proceeds to step 728 in which the continuity of the signal is verified by monitoring the J1 trace using the signal received on the working fiber and the J1 information stored on the next network element. After continuity is verified, it is determined in step 732 whether the signal has reached its endpoint. That is, it is determined if the end of the circuit path has been reached by the signal. When it is determined that the end of the circuit path has not been reached, the indication is that there is at least one additional network element in the circuit path to which the signal is to be transmitted. Accordingly, process flow returns to step 712 in which the current network element, which is the network element on which the J1 trace was monitored in step 728, is set as network element 'A,' and the next network element to receive the signal is identified. Alternatively, if it is determined that the signal has reached its end point, then the process of sending a signal is completed.

Returning to step 720, if it is determined that a failure on a working fiber has been detected by network elements, the indication is that the signal has not been successfully sent between network element 'A' and the next network element on a working fiber. As such, in step 724, it is determined whether there is a protection path available over which the signal may be sent. It should be appreciated that while the protection path may include a protection fiber which substantially directly connects network element 'A' and the next network element, the protection path may instead include other protection fibers and may not include a link or a fiber between network element 'A' and the next network element.

If it is determined in step 724 that there is no protection path available, then the signal fails to be transmitted to its intended end point in step 736. Often, when a signal fails to be transmitted, a network administrator may be notified of the failure. Once the signal fails to be transmitted to its intended end point, the process of sending a signal is terminated.

Alternatively, if it is determined in step 724 that there is a protection path available, then a new protection path is identified in step 740. In one embodiment, as there may be a plurality of suitable protection paths, identifying a protection path may include selecting a protection path from among the plurality of suitable protection paths. Once a protection path is identified for use in substantially forwarding the signal from network element 'A,' a new next network element in the protection path is identified in step 744. The new next network element is generally the network element which is substantially directly coupled to network element 'A' in the protection path.

After the new next network element is identified, network element 'A' switches traffic in step 748 onto a protection fiber between network element 'A' and the next network element, i.e., the new next network element identified in step 744. Then, in step 752, switching nodes broadcast information, e.g., J1 information when the signal is an STS, to substantially all nodes in the BLSR. As will be appreciated by those skilled in the art, switching nodes are generally the network elements associated with the failed working fiber. In the described embodiment, the switching nodes are network element 'A' and the next network element which was identified in step 712. Broadcasting the information to substantially all nodes or network elements generally includes providing the information to control cards of the network elements which may then proceed to provide the information to appropriate linecards within the network elements.

Once the switching nodes broadcast information, the signal which includes the embedded information, e.g., the STS with embedded J1 information, is sent on the protection fiber from network element 'A' to the next network element in step 756. A determination is then made in step 760 regarding whether a failure on the protection fiber between network element 'A' and the next network element has been detected by the network elements. If it is determined that a failure on the protection fiber has been detected, then the indication is that the current switching nodes, i.e., network element 'A' and the next network element, have determined that the signal has failed to be successfully sent between the two current switching nodes. As such, process flow moves from step 760 to step 764 in which it is determined if there is another available protection path associated with network element 'A' which may enable the signal to reach its intended destination.

If it is determined in step 764 that another protection path is available, then process flow returns to step 740 in which another protection path is identified. Alternatively, if it is determined in step 764 that another protection path is not available, then the signal fails to be transmitted to it intended destination, or end point, in step 780, and the process of sending a signal on a BLSR is completed.

Returning to step 760 and the determination of whether a failure on a protection fiber was detected by network elements on the protection path, if it is determined that no failure was detected, then the indication is that the signal sent by network element 'A' was successfully received by the next network element. Accordingly, in step 768, the continuity of the signal is verified using information stored on the nodes of the protection path, i.e., information stored on network element 'A' and the next network element. By way of example, when the signal is an STS, the J1 trace associated with the STS is monitored to verify the continuity of the STS. Monitoring the STS may include comparing J1 information embedded in the STS with J1 information stored on the network elements.

After the continuity of the signal is verified, it is determined in step 772 if the signal has reached the other switching node. That is, it is determined if the next or current network element is an end point or if the next or current network element will attempt to route the signal on a working fiber. It should be appreciated that when the next network element is arranged to attempt to route the signal on a working fiber after having received the signal on a protection fiber, then the next network element is considered to be a switching node.

When it is determined in step 772 that the signal has reached the other switching node and, hence, the next network element is effectively a switching node, then, it is determined in step 776 whether the next network element is an end point, e.g., the end point of the circuit provisioned in step 704 or the intended overall recipient of the signal within the BLSR. If it is determined that the next network element is an endpoint, the process of sending a signal on the BLSR is completed. On the other hand, if it is determined that the next or current network element is not an end point, then process flow returns to step 712 in which the next or current network element is set as network element 'A' and a new next network element in the circuit is identified.

Returning to step 772, if it is determined that the signal has not reached the other switching node, then the implication may be that the next or current network element is a passthrough network element which receives a signal on a protection fiber and forwards the signal on another protection fiber. As such, the current network element, or the network element which is currently arranged to forward the signal, is set as network element 'A' in step 784. Once network element 'A' is set, process flow moves to step 744 in which a new next network element in the protection path is identified.

When an STS is being sent in a BLSR of a SONET, J1 information may be broadcast to substantially all network elements or nodes when a working circuit path has effectively been terminated, and a protection circuit path is to be used to enable the STS to be sent between a start point and an end point. Enabling the J1 information to be broadcast once a failure is detected enables network elements of a protection circuit path to perform J1 monitoring. As such, in the event that the integrity of the STS has been compromised, alarms may be raised even when the STS is on a protection path. Hence, the overall performance associated with the BLSR may be enhanced.

It should be appreciated that trace information may generally be broadcast to substantially all network elements in a BLSR at substantially any time, e.g., before a failure in a working path has been detected. In one embodiment, when the number of total network elements or nodes in a BLSR is relatively low, as for example significantly less than approximately thirty two nodes, trace information such as J1 information may be provided to substantially all network elements in the BLSR at circuit provisioning time such that all network elements may store J1 information in appropriate tables. When substantially all network elements in the BLSR have the J1 information, J1 monitoring may occur over substantially any working path or protection path within the BLSR. It should be appreciated that when a BLSR is relatively small, the memory requirements and the bandwidth maintained to transmit, store, and maintain J1 information on each network element in the BLSR for substantially every circuit associated with the BLSR may be acceptable. That is, the memory and the bandwidth used to send and to store J1 information on each network element in the BLSR for substantially every circuit associated with the BLSR may be such that the benefits of having the J1 information on each network element outweigh issues associated with memory and bandwidth consumption. For example, for a BLSR with approximately ten network elements or less, bandwidth limitations may be such that it may be more efficient to maintain a current table of J1 information on each of the network elements than to broadcast the J1 information when a failure in a working path is detected.

Figure 8:
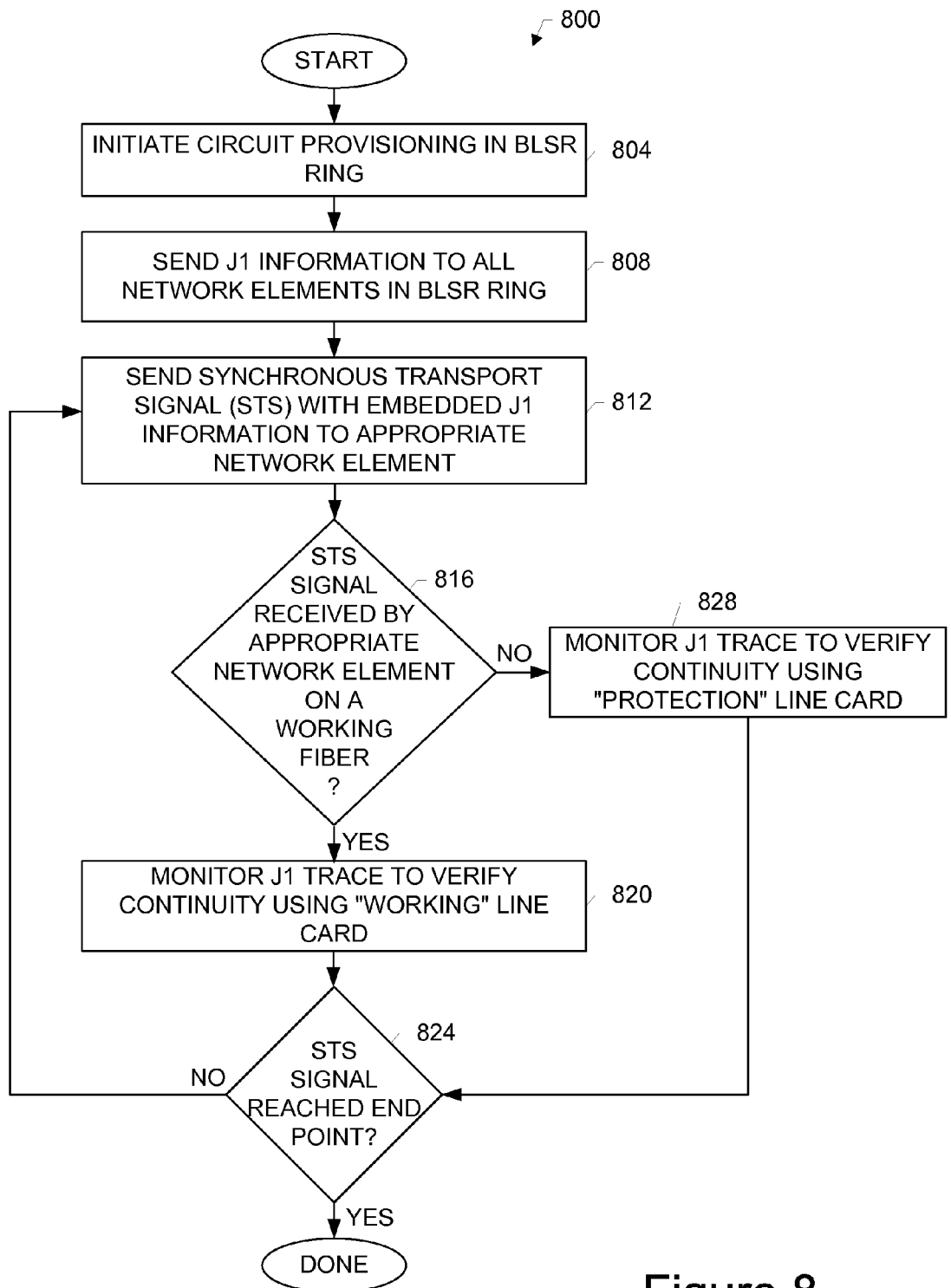
FIG. 8 is a process flow diagram which illustrates the steps associated with a method of sending a signal within a system which provides trace information, e.g., J1 information, to substantially all nodes within a BLSR when a circuit is provisioned in accordance with an embodiment of the present invention.

FIG. 8 is a process flow diagram which illustrates the steps associated with a method of sending a signal within a system which provides trace information, e.g., J1 information, to substantially all nodes within a BLSR when a circuit is provisioned in accordance with an embodiment of the present invention. A process 800 begins at step 804 in which circuit provisioning is initiated in a BLSR. Once circuit provisioning is initiated, trace information, e.g., J1 information or IPPM information, may be sent or broadcast to substantially all network elements in the BLSR in step 808. The trace information may be stored on control cards associated with the network elements.

In step 812, a signal with embedded trace information, as for example an STS with embedded J1 information, is sent to an appropriate network element. That is, a signal is sent from one network element to the next network element in a suitable circuit path, e.g., either a working path or a protection path. After the signal is sent to an appropriate network element, it is determined if the signal was received by the appropriate network element in step 816 on a working fiber. If it is determined that the signal was received on a working fiber, then process flow moves to step 820 in which trace monitoring occurs using a working linecard associated with the appropriate network element to verify the continuity of the signal.

Once a trace such as a J1 trace is monitored to verify the continuity of a signal, a determination is made in step 820 as to whether the signal has reached the end point of its corresponding circuit path. If it is determined that the signal has not reached the end point, process flow returns to step 812 in which the signal is sent to a new appropriate network element. Alternatively, if it is determined that the signal has reached the end point of its corresponding circuit path, then the process of sending a signal is completed.

Returning to step 816, if the determination is that the signal was not received by an appropriate network element on a working fiber, then the implication is that there has either been a failure of a working fiber or a failure of a network element. In other words, if the signal is not received on a working fiber, the signal may be received on a protection fiber. Accordingly, in step 828, trace monitoring occurs using a protection linecard of the appropriate network element to verify the continuity of the signal. The protection linecard may receive trace information such as J1 information from a control card on the appropriate network element. After the continuity of the signal is verified, process flow moves to step 824 in which it is determined if the signal has reached its end point.

Although only a few embodiments of the present invention have been described, it should be understood that the present invention may be embodied in many other specific forms without departing from the spirit or the scope of the present invention. By way of example, the configuration of a system which enables trace monitoring to occur on a protection path may be widely varied. The configuration of network elements within such a system may depend upon factors which include, but are not limited to, the number of fibers or links associated with the system. In addition, the type of switching which is supported by network elements may include, but is not limited to, ring switching and span switching.

In general, the steps associated with the various methods of the present invention may be varied. Steps may be altered, added, removed, and reordered without departing from the spirit or the scope of the present invention. By way of example, in the course of sending a signal such as an STS between a start point and an end point of a BLSR, trace monitoring may result in the continuity of the STS not being verified. In one embodiment, when the continuity of the STS may not be verified, the method of sending a signal may include notifying a network administrator, customer, or user of a lack of continuity, as well as terminating the process of sending the STS.

A method of sending a signal which includes broadcasting trace information such as J1 information to all network elements in a ring has been described above as broadcasting trace information substantially each time a new protection path is to be implemented. It should be appreciated that in one embodiment, the method may include broadcasting trace information substantially only once, e.g., when a first protection path is implemented. Subsequently, when alternate protection paths are implemented because of an failure or inadequacy of the first protection path, it may no longer be necessary to broadcast trace information because the trace information is already available on essentially all network elements in the ring.

A system which enables monitoring of a protection path may be suitable for use within substantially any suitable overall system. Suitable overall systems may generally include, but are not limited to, systems which use SONET, SDH, and OTN standards. Similarly, the information monitored on a protection path may include information other than J1 information, J2 information, C2 information, and IPPM information without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for sending traffic on a path within an optical network system, the optical network system including a plurality of nodes and a plurality of fibers, the method comprising:
   identifying and establishing a circuit path within the optical network system which is associated with a first node of the plurality of nodes, the circuit path being arranged to include at least one fiber selected from the plurality of fibers;
   sending a signal on the circuit path from the first node on the at least one fiber, the signal being arranged to include embedded path trace information;
   determining when the signal is received from the first node by a second node of the plurality of nodes over the at least one fiber;
   identifying a protection path arranged to include at least a first fiber selected from the plurality of fibers and at least a third node selected from the plurality of nodes, the third node having no path trace information for the signal;
   broadcasting path trace information to the plurality of nodes when it is determined that the signal is not received by the second node over the at least one fiber and after the protection path identification step;
   sending the signal from the first node on the protection path; and
   monitoring the signal on the protection path by the path trace information embedded in the signal and the broadcasted path trace information received by the third node.

2. The method of claim 1 further including:
   transmitting the path trace information to the first node and the second node before sending the signal on the circuit path.

3. The method of claim 1 wherein broadcasting the path trace information includes broadcasting the transmitted path trace information from the first node.

4. The method of claim 1 wherein the signal is a synchronous transport signal, the embedded path trace information is embedded J1 information, and the broadcasted path trace information is broadcasted J1 information.

5. The method of claim 1 wherein the embedded path trace information is one selected from the group consisting of J1 information, J2 information, C2 information, and IPPM information, and the broadcasted path trace information is one selected from the group consisting of J1 information, J2 information, C2 information, and IPPM information.

6. A method for sending traffic on a path within an optical network system, the optical network system including a plurality of nodes and a plurality of fibers, the method comprising:

identifying and establishing a circuit path within the optical network system, the circuit path being arranged to include at least one fiber selected from the plurality of fibers and a set of nodes included in the plurality of nodes;

anticipating receiving a signal that is sent on the circuit path on the at least one fiber at a first node included in the set of nodes, the signal being arranged to include embedded path trace information;

identifying a protection path including at least a second node included in the plurality of nodes, the second node having no path trace information for the signal;

transmitting the path trace information to the set of nodes before sending the signal on the circuit path;

determining when the signal is received by the first node over the at least one fiber;

broadcasting path trace information to the plurality of nodes when it is determined that the signal is not received by the first node over the at least one fiber so that the second node can monitor the signal on the protection path and after the protection path identification step; and monitoring the signal using the first node to determine if the transmitted path trace information and the embedded path trace information are consistent when it is determined that the signal is received by the first node over the at least one fiber.

7. The method of claim 6 wherein broadcasting the path trace information includes broadcasting the transmitted path trace information from the first node.

8. The method of claim 6 wherein the embedded path trace information is one selected from the group consisting of J1 information, J2 information, C2 information, and IPPM information, and the broadcasted path trace information is one selected from the group consisting of J1 information, J2 information, C2 information, and IPPM information.

9. A method for sending traffic on a path within an optical network system, the optical network system including a plurality of nodes and a plurality of fibers, the method comprising:

identifying and establishing a circuit path within the optical network system, the circuit path being arranged to include at least one fiber selected from the plurality of fibers, a start node selected from the plurality of nodes, and an end node selected from the plurality of nodes;

transmitting path trace information to the plurality of nodes, wherein the plurality of nodes includes at least one node that is not included in the circuit path;

sending a signal on the circuit path, wherein the signal is substantially initiated from the start node;

determining when the at least one fiber is unable to support the signal;

identifying a protection path within the optical system, the protection path being arranged to include at least a first fiber selected from the plurality of fibers and the at least one node to enable the signal to be provided to the end node;

sending the signal on the protection path when it is determined that the at least one fiber is unable to support the signal; and monitoring the signal on the protection path by comparing path trace information included in the signal with the transmitted path trace information to determine when the path trace information included in the signal is consistent with the transmitted path trace information.

10. The method of claim 9 wherein the signal is a synchronous transport signal, the path trace information is J1 information, and the transmitted path trace information is J1 information.

11. The method of claim 9 wherein the path trace information is one selected from the group consisting of J1 information, J2 information, C2 information, and IPPM information.

12. The method of claim 9 wherein the at least one node includes a control card and at least one linecard, the control card being arranged to store the transmitted path trace information and to provide the transmitted path trace information to the linecard, the linecard being arranged to compare the path trace information included in the signal with the transmitted path trace information.

13. A method for sending traffic on a path within an optical network system, the optical network system including a plurality of nodes and a plurality of fibers, the method comprising:

identifying a circuit path within the optical network system, the circuit path being arranged to include at least one fiber selected from the plurality of fibers and a set of nodes included in the plurality of nodes;

sending a signal on the circuit path between a first node of the set of nodes and a second node of the set of nodes on the at least one fiber, the at least one fiber being arranged to substantially provide a link between the first node to the second node, the signal being arranged to include embedded path trace information;

determining when the signal is received by the second node over the at least one fiber;

broadcasting path trace information to the plurality of nodes when it is determined that the signal is not received by the second node over the at least one fiber;

identifying a protection path arranged to include at least a first fiber selected from the plurality of fibers and at least a third node selected from the plurality of nodes;

sending the signal on the protection path; and monitoring the signal on the protection path by the path trace information embedded in the signal and the broadcasted path trace information received by the third node.

14. The method of claim 13 further including:

transmitting the path trace information to the set of nodes before sending the signal on the circuit path; and monitoring the signal using the second node to determine if the transmitted path trace information and the embedded path trace information are consistent when it is determined that the signal is received by the second node over the at least one fiber.

15. The method of claim 14 wherein broadcasting the path trace information includes broadcasting the transmitted path trace information from at least one of the first node and the second node.

16. The method of claim 13 wherein the third node is included in the set of nodes.

17. The method of claim 13 wherein the protection path is arranged to enable the signal to be provided to a fourth node that is included in the set of nodes and in the protection path, the fourth node being an end point of the circuit path.

18. The method of claim 13 wherein monitoring the embedded path trace information includes verifying when the embedded path trace information is consistent with the broadcasted path trace information.

19. The method of claim 13 wherein the signal is a synchronous transport signal, the embedded path trace information is embedded J1 information, and the broadcasted path trace information is broadcasted J1 information.

20. The method of claim 13 wherein the embedded path trace information is one selected from the group consisting of J1 information, J2 information, C2 information, and IPPM information, and the broadcasted path trace information is one selected from the group consisting of J1 information, J2 information, C2 information, and IPPM information.

21. The method of claim 13 wherein each node of the plurality of nodes includes a control card and at least one linecard, the control card being arranged to store the broadcasted path trace information and to provide the broadcasted path trace information to the linecard, the linecard being arranged to compare the embedded path trace information with the broadcasted path trace information.

* * * * *